(12) United States Patent
Bracq et al.

(10) Patent No.: US 9,235,739 B2
(45) Date of Patent: Jan. 12, 2016

(54) COMMUNICATION DEVICE OF A SYSTEM FOR MONITORING THE WHEELS OF A VEHICLE AND COMMUNICATION METHOD

(71) Applicants: Manuel Bracq, Antibes (FR); Philippe Lefaure, Montbrun Laur (FR)

(72) Inventors: Manuel Bracq, Antibes (FR); Philippe Lefaure, Montbrun Laur (FR)

(73) Assignee: LDL TECHNOLOGY, Ramonville Saint Agne (FR)

( * ) Notice: Subject to any disclaimer, the term of this patent is extended or adjusted under 35 U.S.C. 154(b) by 109 days.

(21) Appl. No.: 13/919,828

(22) Filed: Jun. 17, 2013

(65) Prior Publication Data
US 2014/0009267 A1    Jan. 9, 2014

(30) Foreign Application Priority Data

Jun. 22, 2012  (FR) ...................... 12 55960

(51) Int. Cl.
| | | |
|---|---|---|
| *H04Q 5/22* | (2006.01) | |
| *G06K 7/10* | (2006.01) | |
| *G06K 19/077* | (2006.01) | |
| *B60C 23/00* | (2006.01) | |
| *B60C 23/04* | (2006.01) | |

(52) U.S. Cl.
CPC .......... *G06K 7/10366* (2013.01); *B60C 23/009* (2013.01); *B60C 23/0479* (2013.01); *B60C 23/0483* (2013.01); *G06K 7/10178* (2013.01); *G06K 19/07764* (2013.01)

(58) Field of Classification Search
None
See application file for complete search history.

(56) References Cited

U.S. PATENT DOCUMENTS

| | | | |
|---|---|---|---|
| 2003/0122661 A1* | 7/2003 | Ginman | B60C 23/0408 340/447 |
| 2009/0026254 A1* | 1/2009 | Johnson et al. | 235/375 |
| 2010/0141389 A1* | 6/2010 | Hagl et al. | 340/10.1 |
| 2010/0147063 A1* | 6/2010 | Suzuki et al. | 73/146.5 |

* cited by examiner

*Primary Examiner* — Kerri McNally
*Assistant Examiner* — Renee Dorsey
(74) *Attorney, Agent, or Firm* — Jackson Patent Law Office

(57) ABSTRACT

Disclosed is a communication device of a system for monitoring wheels of a vehicle (C), the wheels (R) being equipped with a tire comprising an electronic chip (200), the tire comprising a metal structure (S),
  remarkable in that it comprises an electronic module (110) housed in the wheel (R) of the vehicle (C),
  the electronic module (110) transmitting waves (O) over a frequency range established so as to enable the waves to be reflected on the metal structure (S),
  so that the waves (O) can reach the chip (200) whatever the position thereof with respect to the module (110) so that the module (110) can correspond with the chip (200) for the purposes of activation and/or transmission of data for writing and/or reading.
Also disclosed is a communication method.
Applications: monitoring of tires.

18 Claims, 4 Drawing Sheets

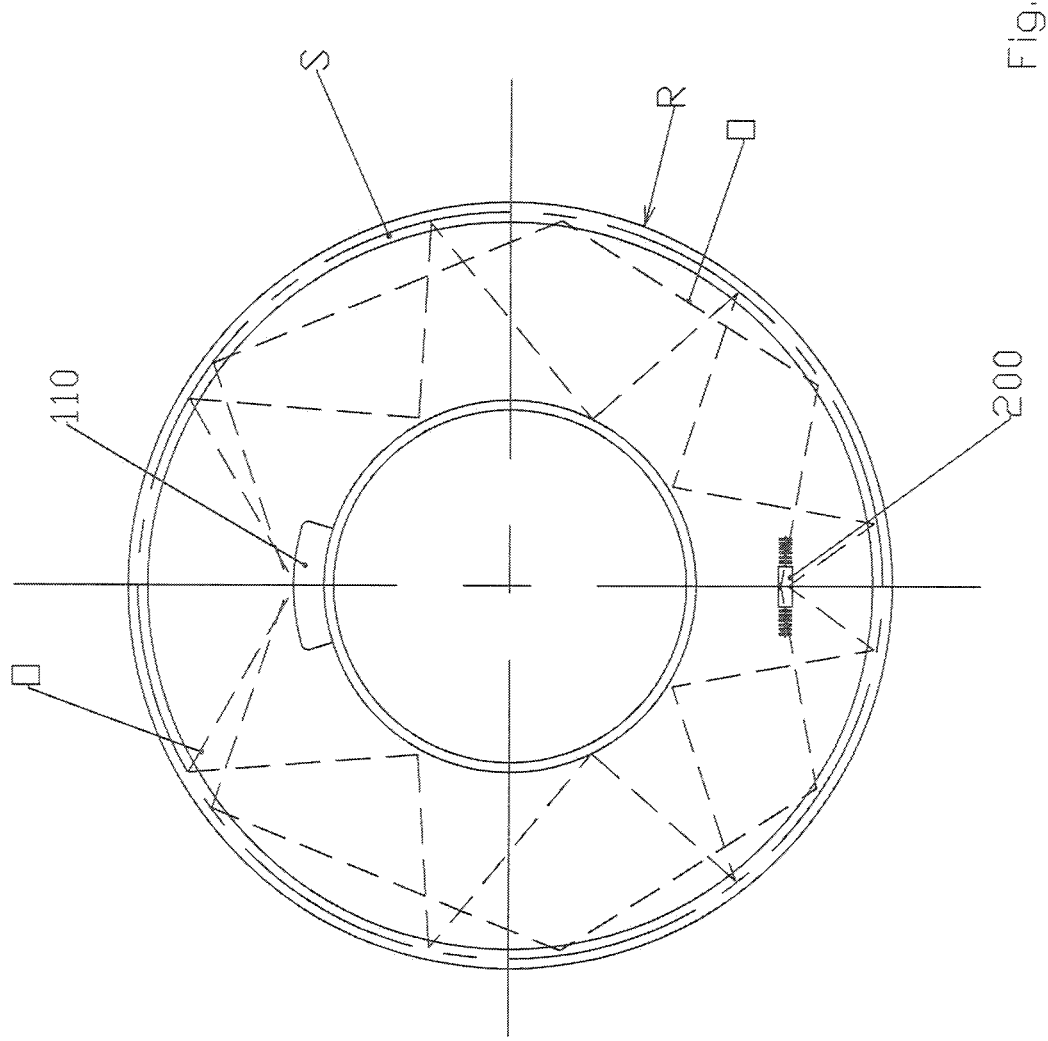

COMMUNICATION DEVICE OF A SYSTEM FOR MONITORING THE WHEELS OF A VEHICLE AND COMMUNICATION METHOD

FIELD OF APPLICATION OF THE INVENTION

The present invention relates to the field of the monitoring of vehicle wheels and in particular to adaptations for improving communication between the various functional subassemblies constituting said system.

DESCRIPTION OF THE PRIOR ART

There exist at the present time tires that accept, actually in their rubber, electronic chips containing a unique memory capable of being read by an item of equipment. These chips are capable of storing data but also retrieving them when they are interrogated. The advantage for tire manufacturers is being able to ensure the traceability of a tire, to identify any retreading thereof and the dates at which maintenance was carried out, and to attempt to better monitor the use of counterfeit tires.

One problem related to the use of these chips lies in the monitoring and location of these tires, which may be moved from one wheel to another during a maintenance operation, but also in the location of the equipped wheel on the vehicle during use. This is because examples of wear on tires are not all similar, in particular on a heavy goods vehicle, and vary according to the position allocated to the wheel on the vehicle.

Currently, in order to solve such a drawback, there exist communication devices comprising wound antennas (generally using low frequencies around 125 kHz), fixed to the chassis of the vehicle close to the wheel arches, these antennas being connected to onboard electronics capable of controlling them. These antennas interrogate the electronic chip integrated in the tire, which responds by transmitting the data relating to the tire in question. The tire is then identified and located in this example, but this requires the presence of a complete electronic system that is expensive and difficult to install on the vehicle, without mentioning the fragility of the antennas exposed in the wheel arches. In addition, this system, relying on a so-called passive chip (not supplied by battery), must be provided with an antenna going all round the tire in order to cover three hundred and sixty (360) degrees of angle and always be accessible to communication with the antennas fixed to the chassis during the rotation of the wheel.

This solution is therefore expensive, requiring one antenna per wheel and an onboard computer dedicated to this application, which is complex to install and fragile.

DESCRIPTION OF EMBODIMENTS OF THE INVENTION

Starting from this state of affairs, the applicant carried out research aimed at proposing a communication solution for solving the problems of the prior art.

This research resulted in the design of a communication device of a system for monitoring wheels on a vehicle, said wheels being equipped with a tire comprising an electronic chip, said tire having a metal structure, remarkable in that it comprises an electronic module housed in the wheel of the vehicle, said electronic module emitting waves over a frequency range established so as to enable said waves to be reflected on the metal structure, so that said waves can reach said chip whatever the position thereof with respect to the module so that the module can correspond with the chip for purposes of activation and/or transmission of data writing and/or reading.

This feature will allow reading, in real time and in movement, of the parameters of the tire issuing from said chip, such as for example the identifier thereof. This communication is made possible by the fact that the waves, which do not arrive directly to their objectives, are reflected because of their nature until they are received. This mode of transmission by multipath reflection eliminates the tedious operations aimed at reducing as far as possible the distance between said chip and said module initially equipping the wheel for purposes of measuring the pressure and/or temperature parameters inside the tire, this type of pairing never being simple in the case of wheels on heavy goods vehicles for example. This feature thus makes it possible to reduce the size of the antenna of the transceiver and thus to reduce the manufacturing cost.

Another advantage is the fact of being able to monitor the history of the tire, to know its running time, to know the references of the tires used and to authenticate the provenance thereof, etc.

The use of the structure of the tire not only ensures reflection of the wave but also the confinement of the latter, preventing any external interference.

Thus, according to another feature, said frequency range is situated beyond 100 MHz, a frequency range able to be used outside tires for other applications, but which would not be interfered with because of the confinement of the field of propagation of the wave.

According to another particularly advantageous feature of an embodiment of the invention, said chip makes dynamic measurements of the tire in which it is installed. The message transmitted to the module then contains parameters related to the wear measured. According to another feature, said chip is a radio label.

Given an additional possibility of transmission and reception of waves to the module equipping the wheels such as those forming part of a wheel monitoring system, the device of an embodiment of the invention responds to the problems for the prior art without requiring a parallel communication network.

Several communication methods have been imagined on the basis of all or some of the features described above. Thus another subject matter of the invention is a method of working of said device. According to a particularly advantageous feature, said communication method, based on a device comprising a radio-frequency receiver associated with the vehicle chassis, consists of causing the electronic module to activate said chip so that the latter communicates with the radio-frequency receiver associated with the chassis. The electronic module illuminates the chip and it is the receiver associated with the chassis that demodulates the signal transmitted by said chip. The electronic module is therefore not then equipped with a means for reading the signal transmitted by the chip, which reduces the cost of the installation.

According to another particularly advantageous feature, the communication method of the device, of the type integrating a portable electronic interrogation module used by a user is remarkable in that it consists, under the control of the user, of causing the portable module to send a signal to the electronic wheel module in order to control the transmission of waves activating the chip that is sending its identifier. This identifier can, according to the method described above, be transmitted to said reception module. Such a method makes this transmission intentional and does not require a transmission strategy dependent on an event in the life of the tire or wheel.

The fundamental concepts of the invention having just been disclosed above in their most elementary form, other details and features will emerge more clearly from a reading of the following description with regard to the accompanying drawings giving, by way of non-limitative example, an embodiment of a device according to the invention.

DESCRIPTION OF THE DRAWINGS

FIG. 2 is a schematic drawing of a wheel equipped with a module and a chip;

DESCRIPTION OF PREFERRED EMBODIMENTS

Figure 1:
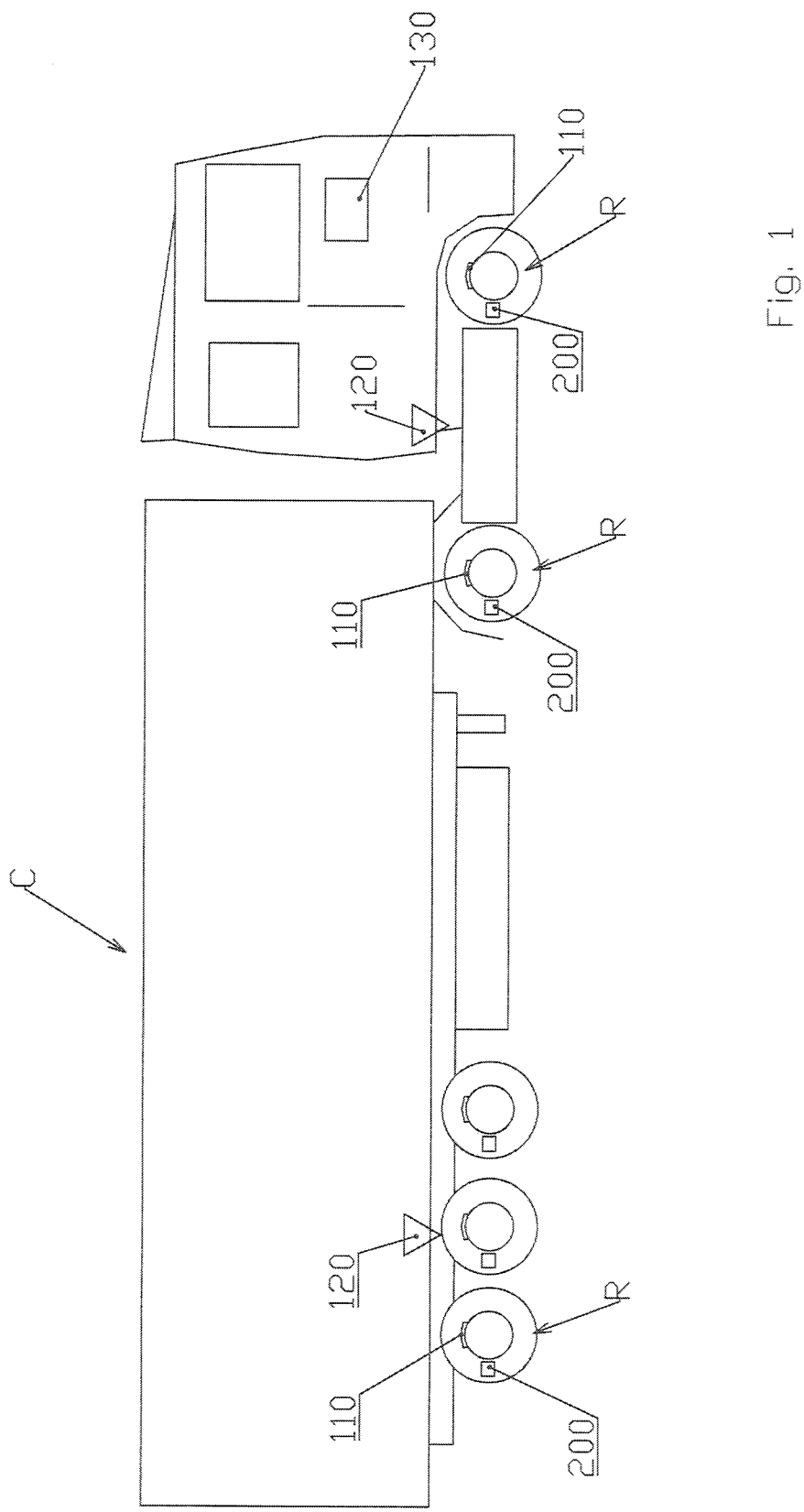
FIG. 1 is a schematic drawing of a truck equipped with a device for monitoring the tire pressure and tires equipped with an RFID marker.
Figure 1A:
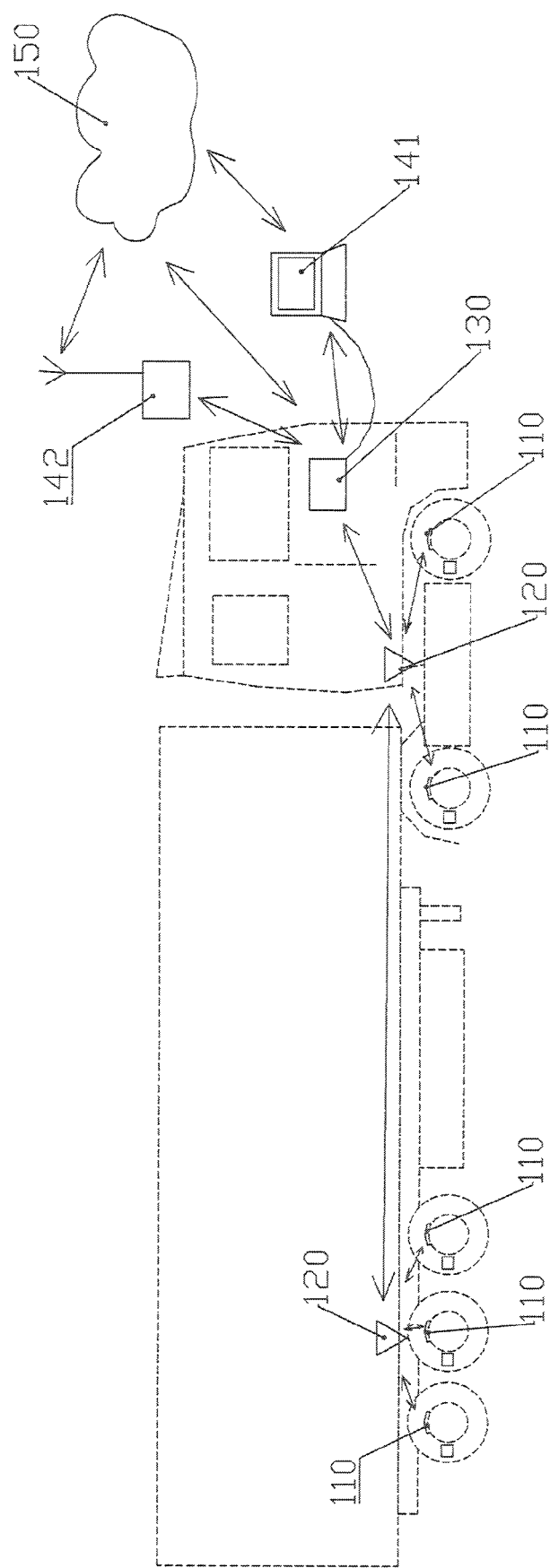
FIG. 1a illustrates the possible communications between the various transmission and reception subassemblies of the truck of FIG. 1.

As illustrated in the drawings in FIGS. 1 and 1a, the vehicle C is equipped with a device for monitoring the pressure of the tires consisting of measuring modules 110 fixed to each wheel R and communicating with reception units 120 fixed to the chassis of the vehicle C, which communicate with a central reception unit 130. This central reception unit 130 is for its part able to communicate without or with cable with a computer 141, a relay antenna 142, or with any means of connection to a network 150 of the GSM, GPS, etc. type.

As illustrated on the drawing in FIG. 2, the wheels R receive tires carrying chips or identifiers of the RFID marker type 200. According to a preferred but non-limitative embodiment, the measuring modules 110 are fixed to the rim and the chips 200 are embedded in the thickness of the rubber constituting the sidewall of the tire. The position of the chip 200 with respect to the measuring module is of little importance because of the device of an embodiment of the invention. The measuring module can be bonded to the tire, clamped to the rim or fixed to the valve.

Figure 3:
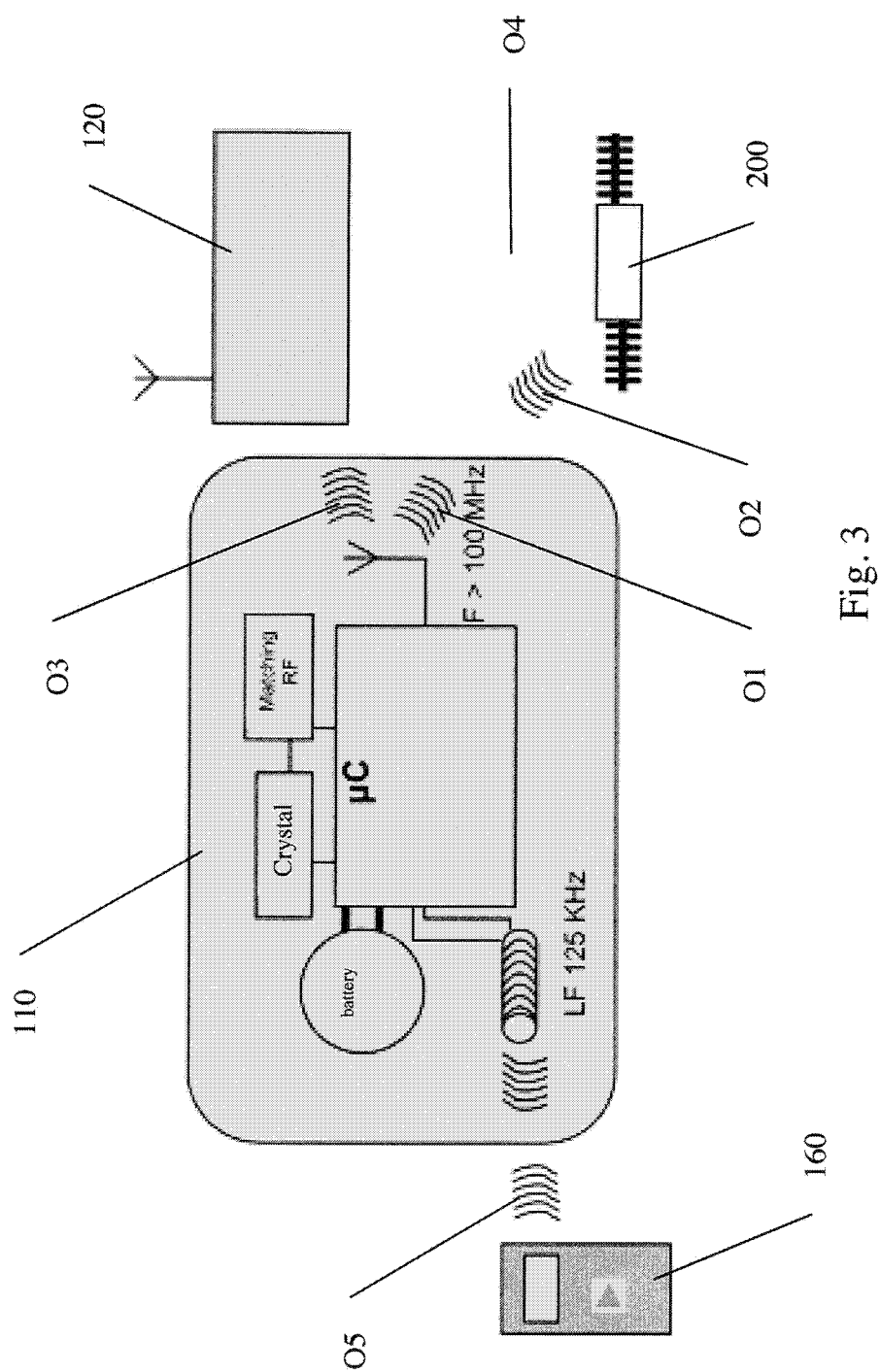
FIG. 3 is a diagram illustrating the communication methods of an embodiment of the invention.

As illustrated on the drawing in FIG. 3, according to a first communication method, so that the identifiers and/or the data (measurement of wear for example) associated with the identifiers of the chips 200 are transmitted in the communication frame of the measuring modules 110, the device of an embodiment of the invention proposes that the data associated with the identifier and/or the identifier of the tire be transmitted to the measuring module 110 for purposes of storage or transmission to the reception module 120, by means of a communication represented by the succession of transmissions O1, O2, O3. In accordance with an embodiment of the invention, the activation and/or the communication of the module 110 with the chip 200 is achieved by means of waves reflected on the metal structure S (cf. FIG. 2) of the tire.

To do this, said module 110 comprises means for transmitting and receiving radio waves situated beyond 100 MHz for communication with the chip 200 and means for transmitting and receiving radio waves situated at low frequency for communication with the reception module 120 or 130. In addition, in order to guarantee that the waves will be transmitted and received in all directions, said module is equipped with an isotropic antenna.

According to another embodiment of a communication method, the electronic module 110 activates, by means of the wave represented by O1 (which is then merely an activation wave), said chip so that the latter communicates (waves O4) with the radio-frequency receiver 120 associated with the vehicle chassis. The wheel module 120 then no longer needs to be equipped with a demodulator.

According to another embodiment of a communication method able to trigger the first two, a portable interrogation module 160 sends, under the control of the user thereof, a signal (O5) to the electronic wheel module 110 in order to control the transmission of activation waves (O1) from the chip that is sending its identifier (O2 or O4).

It will be understood that the device and method that have just been described and depicted above were described and depicted with a view to disclosure rather than a limitation. Naturally various arrangements, modifications and improvements can be made to the above example without for all that departing from the scope of the invention.

The invention claimed is:

1. A system for monitoring a wheel of a vehicle, the wheel having a rotation axis and being equipped with a tire, the tire comprising a metal structure, the system comprising:
   an electronic chip fixed to the tire, to revolve around the rotation axis; and
   an electronic module fixed to the wheel at a location spatially displaced from the electronic chip, to revolve around the rotation axis,
   the electronic module transmitting waves over a frequency range established so as to enable the waves to be reflected on the metal structure of the tire, so that the waves can reach the electronic chip whatever the position thereof with respect to the electronic module so that the electronic module can communicate with the electronic chip for the purposes of activation and/or transmission of data for writing and/or reading.

2. A system according to claim 1 wherein the frequency range is situated beyond 100 MHz.

3. A system according to claim 1 wherein the electronic chip makes dynamic measurements of the tire.

4. A system according to claim 1 wherein the electronic chip is a radio label.

5. A system according to claim 1 further including a radio-frequency receiver associated with a chassis of the vehicle.

6. A system according to claim 1 wherein the electronic module comprises means for transmitting and receiving radio waves situated beyond 100 MHz and means for transmitting and receiving radio waves situated at low frequency.

7. A system according to claim 2 wherein the electronic module is equipped with an isotropic antenna.

8. A method for a system according to claim 5, the method comprising causing the electronic module to activate the electronic chip so that the electronic chip communicates with the radio-frequency receiver associated with the chassis.

9. A method for a system according to claim 1, the method comprising under the control of the user, causing a portable module to send a signal to the electronic module in order to control the transmission of waves activating the electronic chip, which transmits its identifier.

10. A system according to claim 1 wherein a relative position of the electronic module and the electronic chip is such that the waves reflect on the metal structure in a signal path between the electronic module and the electronic chip.

11. A system according to claim 1 wherein a relative position of the electronic module and the electronic chip is such that the waves reflect on the metal structure and reflect on a rim of the wheel in a signal path between the electronic module and the electronic chip.

12. A system according to claim 1 wherein a relative position of the electronic module and the electronic chip is such that a rim of the wheel is between the electronic module and the electronic chip.

13. A system according to claim 1 wherein the electronic chip is fixed to a sidewall of the tire.

14. A system according to claim 1 wherein the electronic chip is embedded in the tire.

15. A system according to claim 1 wherein the electronic chip is embedded in a sidewall of the tire.

16. A system according to claim 1 wherein the electronic module is fixed to a rim of the wheel.

17. A system according to claim 1 wherein the electronic module is fixed to a rim of the wheel, and the electronic chip is fixed to a sidewall of the tire.

18. A system according to claim 1 wherein the electronic module is fixed to a rim of the wheel, and the electronic chip is embedded in a sidewall of the tire.

* * * * *